Patented Oct. 1, 1946

2,408,607

UNITED STATES PATENT OFFICE 2,408,607

MANUFACTURE OF NITRO COMPOUNDS

Gerard Dunstan Buckley, Blackley, Manchester, England, assignor to Imperial Chemical Industries Limited, a corporation of Great Britain No Drawing. Application February 22, 1945,
Serial No. 579,309

In Great Britain January 19, 1944

3 Claims. (Cl. 260—644)

This invention relates to the manufacture of nitro compounds and more particularly it relates to the manufacture of nitro compounds of the formula

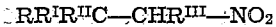

wherein R, $R^I$ and $R^{III}$ may be hydrogen or substituted or unsubstituted aliphatic, cycloaliphatic or heterocyclic radicals or either R or $R^I$ together with $R^{III}$ may form a cycloaliphatic ring and $R^{II}$ is a substituted or unsubstituted hydrocarbon radical, aliphatic, cycloaliphatic or aromatic.

According to the invention I manufacture nitro compounds of the formula given above by a process which comprises causing a $\Delta^\alpha$-nitroolefine of the formula

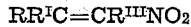

to interact with an organometal halide of the formula

in which formulae R, $R^I$, $R^{II}$ and $R^{III}$ have the significance stated above and where M stands for either a zinc or a magnesium atom and X stands for a halogen atom and thereafter treating the reaction product with water or with aqueous acid.

As $\Delta^\alpha$-nitroolefines which may be used in the process of the invention there have been found to be suitable for example nitroethylene, 1-nitropropylene, 2-nitropropylene, 2-nitro-2-butene, 1-nitrocyclohexene, 1-nitro-2-methylpropene-1 and 1-nitro-2-furylethylene.

Organometal halides which may be used include for example methylzinc iodide, ethylzinc iodide, methylmagnesium iodide, ethylmagnesium iodide, ethylmagnesium bromide, propylmagnesium bromide, n-butylmagnesium bromide, isobutylmagnesium bromide, tertiarybutylmagnesium bromide, n-amylmagnesium bromide, 2-ethylhexylmagnesium bromide, allylmagnesium bromide, cyclopentenylmagnesium bromide, dodecylmagnesium bromide, cetylmagnesium bromide, cyclohexylmagnesium bromide, 1-butinylmagnesium bromide, 1-hexinylmagnesium bromide, phenylmagnesium bromide, n-chlorophenylmagnesium bromide, p-bromophenylmagnesium bromide, p-anisylmagsenium bromide, α-naphthylmagnesium bromide, β-naphthylmagnesium bromide, 4-methyl-1-naphthylmagnesium bromide, tert-amylmagnesium chloride, allylmagnesium chloride, 2-methylallyl-1-magnesium chloride, benzylmagnesium chloride, p-chlorobenzylmagnesium chloride and α-naphthylmethylmagnesium chloride.

The interaction of the $\Delta^\alpha$-nitroolefine with the organometal halide may be brought about by mixing solutions, for example ethereal solutions, of the two reagents. Conveniently the organometal halide is not isolated but is made in solution in a suitable solvent for example ether, by the interaction of the appropriate metal with the appropriate organic halide and is used in the form of the solution so obtained. The reaction proceeds readily and during the admixture of the solutions of the two reagents it is advisable to maintain a low temperature, for example in the region of 0° C. The reaction may be brought to completion by heating the mixed solution to a suitable temperature, for example to the boiling point of the solvent, under a reflux condenser.

The solution containing the complex intermediate product may then be added when cold to water or to an aqueous acid, for example hydrochloric acid or acetic acid, which process results in decomposition of the complex intermediate product with formation of a nitro compound according to the invention. This product may be isolated in any convenient manner, for example by separation of the solvent layer, drying it, evaporating the solvent and distilling the residual nitro compound.

The products of the invention are useful as intermediates in the manufacture of dyestuffs and medicinals.

The invention is illustrated but not limited by the following examples in which parts are by weight.

*Example 1*

An ethereal solution, estimated by the method described in the Journal of the American Chemical Society, 45, 150, (1923), to contain 137 parts of ethylmagnesium bromide (calculated as $C_2H_5MgBr$) and obtained by interaction of 29 parts of magnesium with 109 parts of ethyl bromide in 400 parts of dry ether, is added during one hour to a solution of 100 parts of 1-nitro-2-methyl-propene-1 in 800 parts of dry ether which is stirred and cooled to about 0° C. The mixture is then heated to boiling under a reflux condenser for an hour, then it is cooled again to 0° C. and to it is slowly added a solution of 100 parts of acetic acid in 400 parts of water. The ethereal layer is separated from the mixture, dried by standing over anhydrous magnesium sulphate and is then distilled. There is obtained a colourless oil of B. P. 168–170° C. which is 1-nitro-2:2-dimethylbutane.

Example 2

A solution of 100 parts of 2-nitro-2-butene in 250 parts of dry ether is added during one hour to a stirred solution, kept below 0° C. containing, as estimated by the method of analysis referred to in Example 1, 137 parts of ethylmagnesium bromide (prepared from 29 parts of magnesium, 109 parts of ethyl bromide and 400 parts of dry ether). The mixture is heated to boiling under a reflux condenser during one hour and the product after treatment with 100 parts of acetic acid dissolved in 400 parts of water, is isolated as described in Example 1. There is obtained 60 parts of a colourless oil of B. P. 70–73°/20 mms. which is 2-nitro-3-methylpentane.

Example 3

The procedure described in Example 2 is repeated with the exception that 87 parts of 2-nitro-propylene are used in place of the 2-nitro-2-butene. There is obtained 2-nitropentane of B. P. 148–150° C.

Example 4

A solution of 20 parts of 2-nitro-2-butene in 80 parts of dry ether is added during 1 hour to a stirred solution, kept below 5° C., containing 55 parts of phenylmagnesium bromide (prepared from 7.6 parts of magnesium, 49.5 parts of bromobenzene and 120 parts of dry ether. The mixture is stirred for ¾ hour at 15–20° C. and the product after treatment with 28 parts of acetic acid in 150 parts of water, is isolated as described in Example 1. 2-nitro-3-phenylbutane is thus obtained as a pale yellow oil, B. P. 120° C./20 mms.

Example 5

30 parts of 2-nitro-2-butene dissolved in 120 parts of dry ether is added during 1 hour to a stirred solution, kept below 5° C., of 54.5 parts of n-dodecyl-magnesium bromide (prepared from 5.3 parts of magnesium, 54 parts of n-dodecyl bromide and 80 parts of dry ether). The mixture is heated at the boil under a reflux condenser for 1 hour, and the product after treatment with 24 parts of acetic acid dissolved in 100 parts of water, is isolated as described in Example 1. 2-nitro-3-methylpentadecane is thus obtained as a colourless oil, B. P. 115° C./0.06 mm.

Example 6

A solution of 34 parts of 1-nitro-2-methyl-propene-1 in 30 parts of dry ether is added during 1 hour to a stirred solution, kept at 0–10° C. containing 90 parts of ethylmagnesium iodide in 160 parts of dry ether. The mixture is stirred at 15–20° C. for 2 hours, cooled again to 0° C. and slowly treated with a solution of 30 parts of acetic acid dissolved in 120 parts of water. The product, isolated as described in Example 1, is 1-nitro-2:2-dimethyl-butane, identical with the product of Example 1.

When the ethylmagnesium iodide in the above example is replaced by the equivalent amounts of methylmagnesium iodide and tert-amylmagnesium chloride the products are nitroneopentane, B. P. 77–8° C./65 mm. and 1-nitro-2:2:3:3-tetramethylpentane B. P. 102° C./11 mms., respectively.

Example 7

A solution of 105 parts of nitroethylene in 400 parts of dry ether is added during 1 hour to a stirred solution, kept below 0° C., containing 362 parts of n-butylmagnesium bromide (prepared by reacting 60 parts of magnesium with 342 parts of n-butyl bromide in 650 parts of dry ether). The mixture is stirred at 20° C. for 1 hour, and the product after treatment with a solution of 240 parts of acetic acid in 1500 parts of water is isolated as described in Example 1. 1-nitrohexane is thus obtained in the form of a colourless oil.

Example 8

A solution of 14 parts of 1-nitro-2-furyl-ethylene in 70 parts of dioxan is added during 1 hour to a stirred solution of 36 parts of n-butylmagnesium bromide in ether (prepared as described in Example 7), the temperature being kept below 10° C. The mixture is stirred at 20° C. for 18 hours and after treatment with 20 parts of acetic acid in 100 parts of water, the product is isolated as described in Example 1. 1-nitro-2-furylhexane is thus obtained as a yellow oil, B. P. 78–82° C./0.4 mm.

Example 9

A mixture of 15 parts of 1-nitro-2-methylpropene-1 and 12 parts of dry ether is added during 1 hour to a stirred solution, kept below 10° C., of 55 parts of ethylzinc iodide in a mixture of dry benzene and acetate (prepared from 47 parts of ethyliodide by the method of Blaise and Picard. A. ch. (8), 26, 265). The mixture is then stirred at 50° C. during 3 hours, poured into 100 parts of crushed ice and treated with 20 parts of acetic acid. The product, isolated as described in Example 1, is 1-nitro-2:2-dimethyl-butane, identical with the product of Example 1.

Example 10

A mixture of 29 parts of 1-nitro-1-propene and 35 parts of ether is added during 1 hour to a stirred solution of cyclohexylmagnesium bromide (prepared by reacting 81.5 parts of cyclohexylbromide with 12 parts of magnesium in 300 parts of ether), the temperature being kept below 10° C. The mixture is then stirred at 20° C. for 2 hours, treated with a solution of 35 parts of acetic acid in 300 parts of water, and the product isolated as described in Example 1. There is thus obtained 1 - nitro - 2 - cyclohexyl-propane as a colourless oil, B. P. 122°/16 mms.

When the cyclohexylmagnesium bromide used in the above example is replaced by the equivalent amount of p-bromophenylmagnesium bromide, the product is 1-nitro-2-p-bromophenylpropane, B. P. 115–120° C./0.02 mm.

Example 11

A solution of 32 parts of 1-nitrocyclohexene in 120 parts of dry ether is added during 1 hour to a stirred solution, kept below 5° C., of 37.6 parts of benzylmagnesium chloride (prepared from 6.3 parts of magnesium, 33 parts of benzyl chloride and 100 parts of ether). The mixture is heated to boiling under a reflux condenser for 1 hour and the product, after treatment with a solution of 24 parts of glacial acetic acid in 100 parts of water, is isolated as described in Example 1. This gives 1-nitro-2-benzylcyclohexane as a pale yellow oil.

Example 12

The procedure described in Example 6 is repeated with the exception that a solution containing 72.5 parts of allylmagnesium bromide (prepared from 40 parts of magnesium, 66 parts of allyl bromide and 220 parts of ether, and filtered from unchanged magnesium) are used in place of the ethylmagnesium iodide. There is obtained 1-nitro-2:2-dimethyl-4-pentene of B. P. 68–70° C./20 mms.

I claim:

1. The process for the manufacture of nitro compounds of the formula $$RR^IR^{II}C\text{—}CHR^{III}\text{—}NO_2$$

which comprises causing a $\Delta^\alpha$-nitroolefine of the formula $$RR^IC=CR^{III}NO_2$$

to interact with an organometal halide of the formula $R^{II}MX$, and thereafter treating the reaction product with a compound selected from the group consisting of water and aqueous acid; the aforesaid symbols having respective meanings as follows:

M is selected from the group consisting of magnesium and zinc;

X is a halogen;

R, $R^I$ and $R^{III}$ are respectively selected from the group consisting of hydrogen, acyclic hydrocarbon radicals, alicyclic hydrocarbon radicals, and furyl radicals; and $R^{II}$ is a hydrocarbon radical.

2. The process of claim 1 wherein the interaction of said $RR^IC=CH^{III}NO_2$ and said $R^{II}MX$ is effected in solution and brought to completion by heating to approximately the boiling point of the solvent, after which said solution is treated with a compound selected from the group consisting of water and aqueous acid.

3. The process of claim 1 wherein ethyl-magnesium bromide and 1-nitro-2-methyl-propene-1 are interacted to yield 1-nitro-2:2-dimethylbutane.

GERARD DUNSTAN BUCKLEY.